United States Patent [19]
Circello et al.

[11] Patent Number: 5,911,151
[45] Date of Patent: *Jun. 8, 1999

[54] OPTIMIZING BLOCK-SIZED OPERAND MOVEMENT UTILIZING STANDARD INSTRUCTIONS

[75] Inventors: Joseph C. Circello, Phoenix, Ariz.; James N. Hardage, Jr., Kyle; Glen A. Harris, Austin, both of Tex.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/630,152

[22] Filed: Apr. 10, 1996

[51] Int. Cl.$^6$ .................................................. G06F 13/28
[52] U.S. Cl. ........................... 711/201; 711/167; 711/118; 395/855; 395/200.3; 395/200.5; 395/287
[58] Field of Search ..................................... 395/411, 376, 395/287, 445, 284, 823, 2, 855, 200.3, 200.5, 880, 200.61, 200.62; 711/118, 167, 201

[56] References Cited

U.S. PATENT DOCUMENTS

| 4,564,899 | 1/1986 | Holly et al. | 395/284 |
|---|---|---|---|
| 4,802,085 | 1/1989 | Levy et al. | 395/823 |
| 4,816,997 | 3/1989 | Scales, III et al. | 395/290 |
| 4,912,631 | 3/1990 | Lloyd | 395/445 |
| 5,185,694 | 2/1993 | Edenfield et al. | 395/287 |

OTHER PUBLICATIONS

"Test architecture of the Motorola 68040". Computer Design–ICCD '90, 1990.
"The 68060 on–chip memory subsystem". COMPCON Spring '90 IEEE Computer Society Int'l. Conference, 1990.
"The 68040 processor. 2 Memory design and chip". IEEE Micro vol. 10. Issue 3, Jun. 1990.

Motorola M68000 Family Programmer's Reference Manual, M68000PM/AD Rev. 1, ©1992 Motorola,Inc. Motorola Literature Distribution, P.O. Box 20912, Phoenix, Az., 85036.
Motorola MCF5200 Coldfire™ Faimily Programmer's Reference Manual, MCF5200PRM/AD ©1995 Motorola,Inc. Motorola Literature Distribution, P.O. Box 20912, Phoenix, Az., 85036.
Motorola MC68040 32–Bit Third Generation Microprocessor User's Reference Manual, M68040UM/AD ©1989 Motorola,Inc. Motorola Literature Distribution, P.O. Box 20912, Phoenix, Az., 85036.

*Primary Examiner*—Eddie P. Chan
*Assistant Examiner*—T. V. Nguyen
*Attorney, Agent, or Firm*—Bruce E. Heyden; Jeffrey G. Toler

[57] ABSTRACT

A computer processor (110) automatically generates block-size operand references during execution of standard instructions. As such a standard instruction is executed, the processor (110) continually examines the number of bytes to be moved (342) and the relative alignment of the operand address (352). At any time during instruction execution, if the operand address is zero modulo the block size, and at least a block sized number of bytes remain to be moved (354), the operand transfer is marked as a block-sized reference.

This provides a convenient method for generating block-sized memory references to/from the targeted address space, independent of cache modes such as copyback, write-through, or non-cacheable. This may produce burst accesses, maximizing performance of the data transfer. Additionally, cache memory writes can be optimized to avoid cache line fill reads.

The result is that such standard instructions become the optimal method of transferring data from a source to a destination without the need for special instructions.

19 Claims, 12 Drawing Sheets

OPTIMIZING BLOCK-SIZED OPERAND MOVEMENT UTILIZING STANDARD INSTRUCTIONS

FIELD OF THE INVENTION

The present invention generally relates to computer processors, and more specifically to optimizing block-sized data transfers utilizing standard instructions.

BACKGROUND OF THE INVENTION

As the performance of microprocessors increase, the need to optimize operand movement and maximize the utilization of the bus becomes increasingly important. Some microprocessors employ special instructions to optimize operand movement. These instructions typically have an implied cache characteristic for the operand movement.

The use of unique operand movement instructions requires forethought and knowledge that is possibly available only at run-time. A single implied cache mode for the operand movement limits flexibility and potentially deteriorates performance. Additionally, the use of special-purpose instructions may impose an unrealistic burden on compilers, such that the special-purpose instructions are not generated.

The Motorola 68040 processor has a special instruction to implement line-size or block-size transfers. This "MOVE16" instruction transfers sixteen bytes from a source address to a destination address, where the source and destination are memory locations. The instruction takes advantage of cache read hits. No cache allocation takes place on read or write misses. Finally, cache write hits cause invalidation of matching entries.

Hewlett-Packard in its PA-RISC architecture has a similar special purpose block copy instruction. This block copy instruction provides special indications to the cache to optimize cache operation during execution of this instruction.

One problem with the approach utilized in the 68040 and PA-RISC architectures is the necessity of using a special instruction to take advantage of optimized line-sized or block-sized data transfers. A second problem involves implied cache characteristics associated with such special instructions. Unfortunately, the restrictions on such specialized instructions make it hard to utilize in more general situations. The result is that such specialized instructions are rarely generated by compilers.

SUMMARY OF THE INVENTION

In accordance with the invention, a computer processor automatically generates block-size operand references during execution of standard instructions. As such a standard instruction is executed, the processor continually examines the number of bytes to be moved and the relative alignment of the operand address. At any time during instruction execution, if the operand address is zero modulo the block size, and at least a block sized number of bytes remain to be moved, the operand transfer is marked as a block-sized reference.

This provides a convenient method for generating block-sized memory references to/from the targeted address space, irrespective of cache modes such as copyback, write-through, or non-cacheable. This may produce burst accesses, maximizing performance of the data transfer. Additionally, block-sized cache memory writes can avoid cache read fills.

The result is that such standard instructions become the optimal method of transferring data from a source to a destination without the need for special instructions.

These and other features, and advantages, will be more clearly understood from the following detailed description taken in conjunction with the accompanying drawings. It is important to point out that there may be other embodiments of the present invention which are not specifically illustrated.

DETAILED DESCRIPTION OF A PREFERRED EMBODIMENT

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

This invention allows a processor to automatically generate line-sized operand references during execution of an instruction referencing multiple memory locations such as the Motorola 68000 series MOVEM (move multiple) instruction. As such a multiple memory location referencing instruction is executed, the processor continually examines the number of words remaining to be moved and the relative alignment of the current operand address. At any time during the instruction's execution, if the operand address modulo the cache line size is equal to zero, and at least a cache line size quantity of data remains to be moved, the operand transfer is optimized by marking it as a line-sized reference.

This mechanism provides a convenient and efficient method of generating line-sized references to or from a targeted operand space, irrespective of the cache mode (copyback, write-through, non-cacheable). In the Motorola ColdFire architecture, the generation of such a line-sized reference typically produces a burst access, which maximizes performance of the data transfer. If the destination space is a copyback area, where write miss accesses cause cache allocation, the cache line fill read is avoided and the entire line is sourced directly from the processor core.

Figure 1:
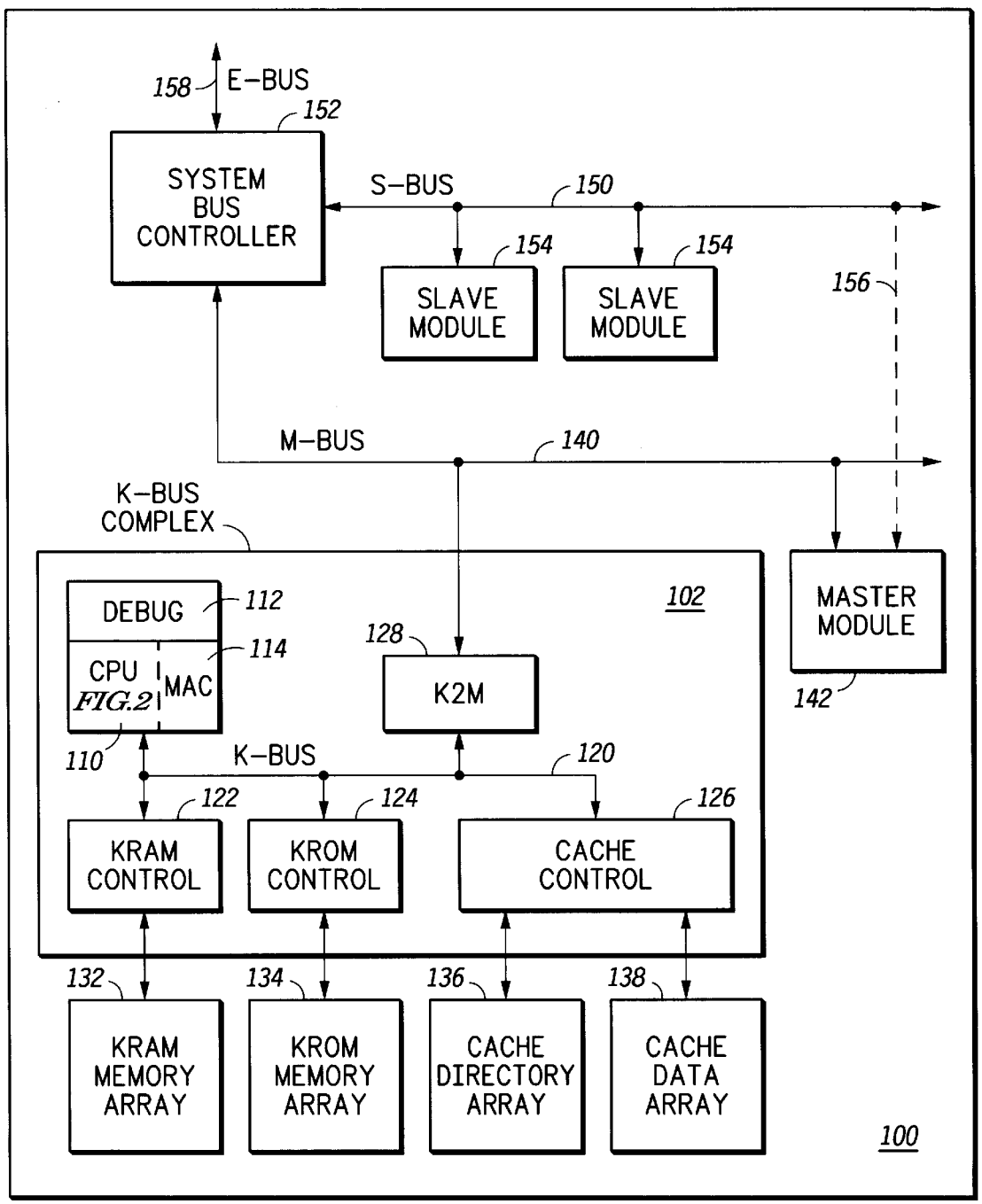
FIG. 1 is a block diagram showing a Motorola ColdFire System Architecture, in accordance with the present invention.

FIG. 1 is a block diagram showing the Motorola ColdFire System Architecture. The ColdFire system is an optimized implementation of the Motorola 68000 family instruction set architecture with numerous 68000 instruction opcodes removed to minimize silicon and produce a streamlined hardware architecture. One of the supported instructions is the MOVEM instruction that provides for multiple registers to be read from or written to memory. With the optimization disclosed herein, the MOVEM instruction is the preferred method of moving blocks of data to and from the processor, both from an instruction execution speed viewpoint, as well as the ability to generate line-sized references.

Continuing with FIG. 1, the general ColdFire system 100 has an K-Bus Complex 102. In the K-Bus Complex 102 is a ColdFire (CF) Core CPU 110 (see FIG. 2). This CPU 110 executes a minimized 68000 family instruction set. Integrated with the CPU 110 is a Debug unit 112 and an optional Multiply and Accumulate (MAC) unit 114. Central to the K-Bus Complex 102 is a "Kore Bus" ("K-Bus") 120. This is a high speed, single cycle 32 bit bus. Coupled to the K-Bus 120 are a KRAM Controller 122, a KROM Controller 124, a Cache Controller 126, and a K-Bus to M-Bus (K2M) converter 128.

The KRAM Controller 122 is coupled to and controls access to a KRAM memory array 132. This primarily comprises Static Random Access Memory (SRAM). Similarly, the KROM Controller 124 is coupled to and controls access to a KROM memory array 134. This is constructed from Read Only Memory (ROM). Likewise, the Cache Controller 126 is coupled to and controls access to the system cache, which is comprised of a Cache Directory Array 136 and Cache Data Array 138. The Cache Directory Array 136 and the Cache Data Array 138 are typically constructed from fast Static Random Access Memory (SRAM). The configuration shown in FIG. 1 represents the current maximum number of memory modules within the K-Bus Complex 102. Systems can be designed with any of these memory Nodules (KRAM 132, KROM 134, Cache 136, 138) removed.

The K2M converter 128 couples the K-Bus 120 to a Master Bus ("M-Bus") 140. The M-Bus 140 is coupled to and controls access to a Master Module 142 and a System Bus Controller 152. The System Bus Controller 152 is additionally coupled to and controls a Slave Bus ("S-Bus") 150 and an External Bus ("E-Bus") 158. The S-Bus 150 is coupled to Slave Modules 154. Finally, the S-Bus 150 can also be coupled to the Master Module 142. The system modules outside the K-Bus Complex 102, as well as the S-Bus 150, and E-Bus 158 are optional. They are not present in all configurations and are shown here only for completeness.

Figure 2:
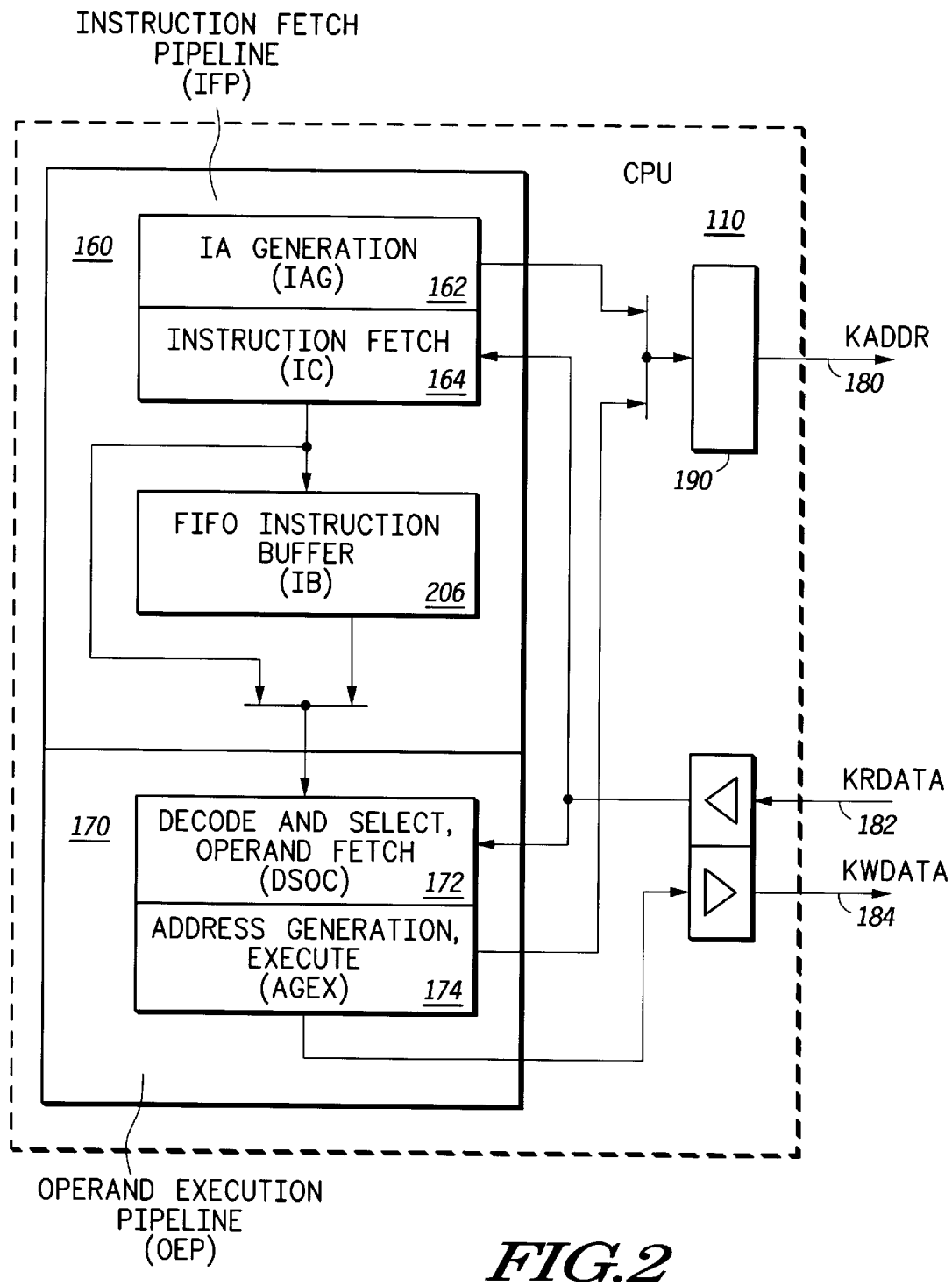
FIG. 2 is a block diagram showing the components in the Central Processing Unit (CPU) shown in FIG. 1.

FIG. 2 is a block diagram showing the components in the Central Processing Unit (CPU) 110. The CPU 110 has two primary components, an Instruction Fetch Pipeline (IFP) 160, and an Operand Execution Pipeline (OEP) 170. These two pipelines operate independently using the FIFO (First-In, First-Out) Instruction Buffer 206 as the decoupling mechanism. The IFP 160 has an Instruction Address Generation (IAG) module 162 and an Instruction Fetch Cycle (IC) module 164, and implements a two-stage pipeline (IAG 162, IC 164) with an optional third stage (IB 168). The IAG module 162 generates the address of the next instruction to fetch, while the IC module 164 receives the instruction fetched from memory using the address generated by the IAG module 162. The instructions are fetched from one of the memories residing within the K-Bus Complex 102 (KRAM 132, KROM 134, or the Cache Data Array 138), or from an S-Bus module (Slave Module 154), or from an external device (not shown) connected to the E-Bus 158. The usual flow typically loads the fetched instruction into the FIFO Instruction Buffer 206 for subsequent loading into the OEP 170 during the IB pipeline stage 168 as required. If the OEP 170 is waiting for an instruction, the fetched instruction can bypass the FIFO Instruction Buffer 206, and be loaded directly into the OEP 170.

The Operand Execution Pipeline (OEP) 170 has a Decode and Select Operand Fetch Cycle (DSOC) module 172 and an Address Generation and EXecute (AGEX) Module 174, and implements a 2-stage pipeline (DSOC 172, AGEX 174). Instructions arrive from the IFP 160 and are decoded in the DSOC module 172 and executed in the AGEX module 174. Address generation is performed by the IAG module 162 when initiating instruction fetches, and the Address Generation and EXecute (AGEX) Module 174 for operand references. Memory reads and writes are initiated when transmitting a memory address on the address portion of the K-Bus ("KADDR") 180. This is accomplished by transmitting the relevant address to a RZADDR register 190. In the case of data reads, the resulting data is received on the read portion of the K-bus ("KRDATA") 182. Data received from KRDATA 182 is routed to either the Instruction Fetch (IC) module 164, or the Decode, Select, and Operand Fetch (DSOC) Module 172, as appropriate. Data writes operate in a similar manner. The desired memory address is transmitted on the KADDR bus 180, and the data is transmitted on the write portion of the K-Bus (KWDATA) 184. Note that the K-Bus 120 implementation shown herein has separate read (KRDATA 182) and write (KWDATA 184) elements. It should be understood that this is for illustrative purposes only, and the disclosed invention in no way is restricted in this manner.

Figure 3:
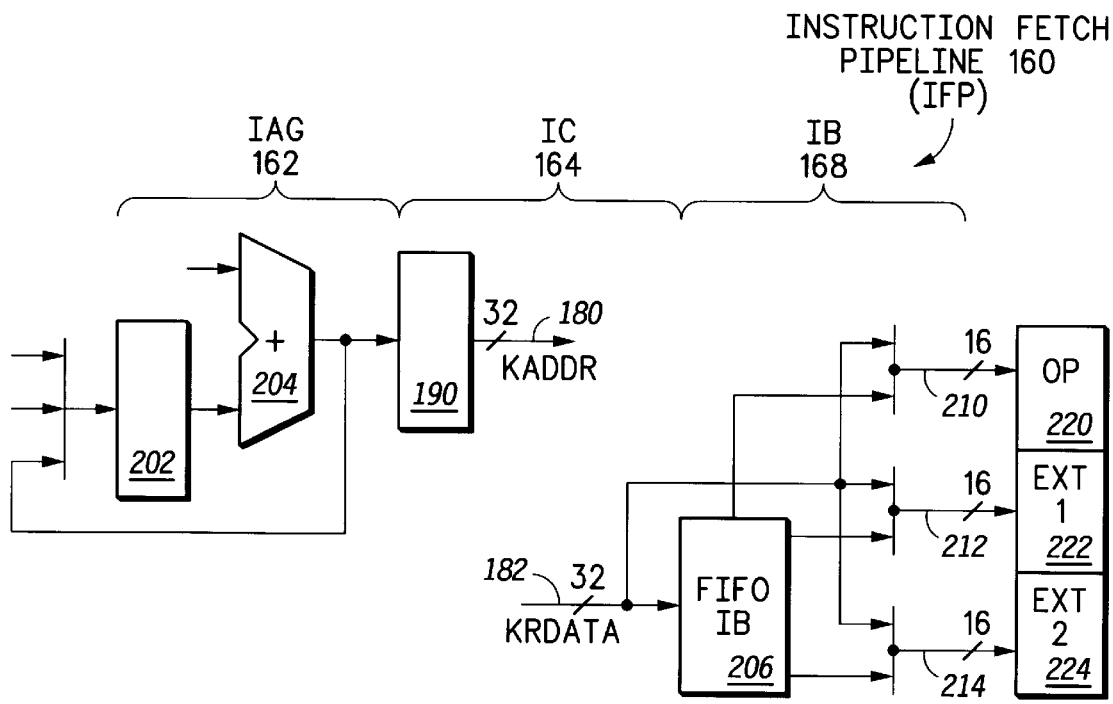
FIG. 3 is a block diagram showing the operation of the Instruction Fetch Pipeline (IFP) component shown in FIG. 2.

FIG. 3 is a block diagram showing the operation of the Instruction Fetch Pipeline (IFP) 160. The Instruction Fetch Pipeline 160 consists of three phases: Instruction Address Generation (IAG) 162, Instruction Fetch Cycle (IC) 164, and Instruction Buffering (IB) 168. Instruction Address Generation (IAG) 162 phase calculates the next prefetch address by incrementing the current instruction address (RA) register 202 by a constant with adder 204. The resulting address is loaded into the RZADDR register 190 and is transmitted back to the registered address (RA) register 202. The address is also transmitted on the KADDR bus 180.

At the end of the Instruction Fetch Cycle (IC) phase 164, the instruction requested is received on the KRDATA bus 182. The instruction received is placed in the FIFO Instruction Buffer 206, unless a FIFO Buffer bypass is selected, in which case the fetched instruction is routed directly to the Operand Execution Pipeline (OEP) 170 (see FIG. 4). In either case, the fetched instruction is separated into one, two, or three sixteen (16) values, depending on whether the instruction is a 16, 32, or 48 bit instruction, and routed to the appropriate 16-bit piece of the instruction register. The first sixteen (16) bits 210 of an instruction are loaded into the OPcode register (OP) 220. The second sixteen (16) bits 212, if needed, are loaded into a first EXTension register (EXT1) 222. The third sixteen (16) bits 214 of an instruction, if needed, are loaded into a second EXTension register (EXT2) 224.

Figure 4:
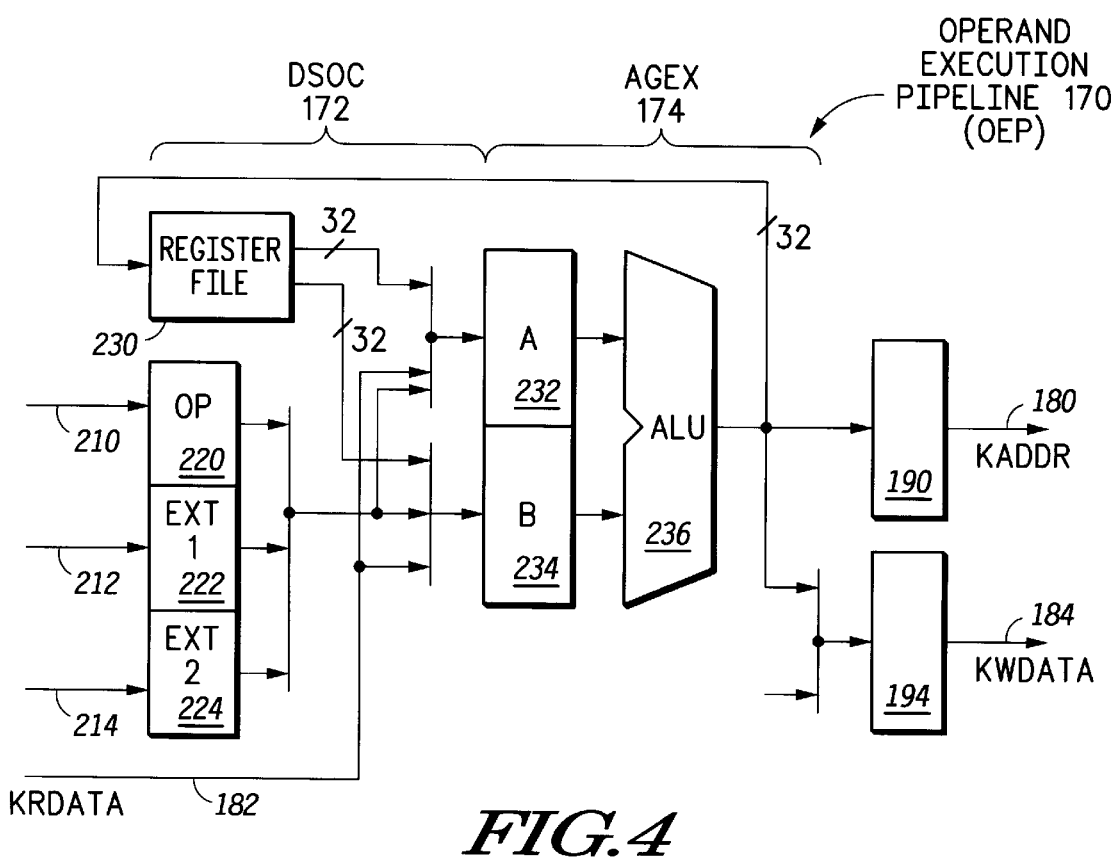
FIG. 4 is a block diagram showing the Operand Execution Pipeline (OEP) shown in FIG. 2.

FIG. 4 is a block diagram showing the Operand Execution Pipeline (OEP) 170. The Operand Execution Pipeline 170 has two phases: a Decode, Select, and Operand Fetch Cycle (DSOC) phase 172, and an Address Generation and EXecute (AGEX) phase 174. In the DSOC phase 172, the OPcode register 220, EXT1 register 222, and EXT2 register 224 are decoded. Depending on addressing mode, part of the instruction may contain an immediate operand needed in an address computation. In such a case, the contents of the corresponding EXT1 register 222, or EXT2 register 224 are transmitted through use of a pair of multiplexers (muxes) to either an "A" register 232 or a "B" register 234. If the contents of one or more registers are required by the selected addressing mode, the values from the selected registers are received from the Register File 230 and routed through the two muxes to the A register 232 and/or the B register 234. The contents of the A register 232 and the B register 234 are combined as required by the addressing mode specified in the decode of the OPcode (OP) register 220 by the Arithmetic Logical Unit ("ALU") 236. The resulting operand address is transmitted to the RZADDR register 190, and in the case of an operand fetch requirement, the address is transmitted on the KADDR bus 180 along with a Read (or Write) Request function, as defined by the KRW signal (see Table T-1).

The ALU 236 is also used for instruction execution as required by the opcode decode for arithmetic and logical computations involving operands. Operands to the ALU 236 may be received from memory reads on the KRDATA bus 182, register file (RGF) 230 reads, or immediate operands contained in the instruction register defined by OP 220, EXT1 222, and EXT2 224. The ALU 236 can perform addition, subtraction, multiplication, logical operations, etc. as required by the instruction indicated by the contents of the OPcode register 220. The operand produced by ALU 236 operation on the A register 232 and B register 234 operands is potentially written back as a register into the Register File (RGF) 230. The operand resulting from ALU 236 operation can also be stored in a KWDATA register 194 for transmission on the KWDATA bus 184. This can result in a write of the operand at the address loaded into the RZADDR register 190 in Memory.

Figure 5:
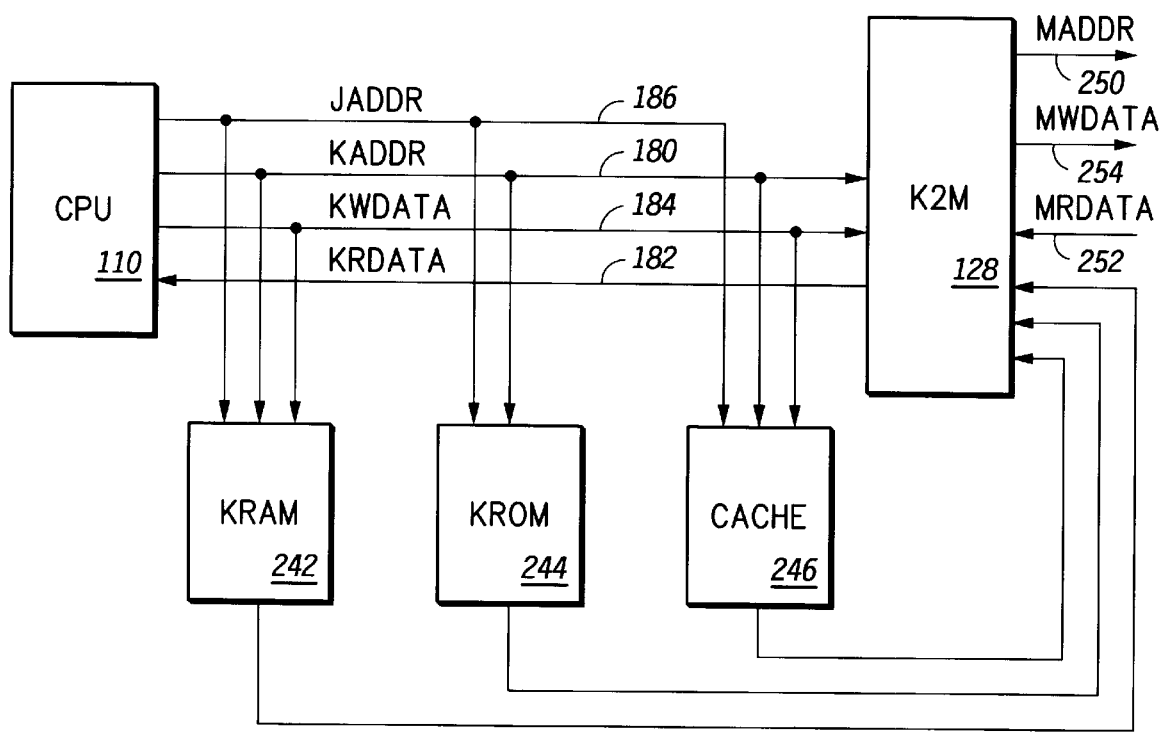
FIG. 5 is a block diagram showing more detail as to the connectivity of the K-Bus shown in FIG. 1.

FIG. 5 is a block diagram showing more detail as to the connectivity of the K-Bus 120. The K-Bus 120 is primarily comprised of an address bus (KADDR) 180, a read data bus (KRDATA) 182, a write data bus (KWDATA) 184, and a control bus (not shown). There is also a JADDR bus 186 for use in controlling the memories 242, 244, 246. The KADDR 180, KRDATA 182, and KWDATA 184 busses are coupled with the KRAM complex 242, KROM complex 244, and Cache complex 246. When the processor 110 requires that data be written to memory 242, or 246, the data to be written is transmitted on the KWDATA bus 184, and the address to which to write the data is transmitted on the KADDR bus 180. Data can be written to either the KRAM 242, or Cache 246. The KRAM complex 242 consists of the KRAM controller 122 coupled to a KRAM memory array 132. The KROM 244 consists of the KROM controller 124 coupled to a KROM memory array 134. The Cache complex 246 comprises the Cache controller 126 coupled to the Cache Directory Array 136, and the Cache Data Array 138.

When the CPU 110 generates a K-Bus 120 bus cycle, the K2M module 128 determines if the desired memory location is mapped into one of the K-Bus memory devices. If the access "hits" in one of the K-Bus memory devices, the appropriate memory (KRAM 242, KROM 244, or Cache 246) responds. For read accesses, the data is transmitted to K2M 128 and driven back to CPU 110 on KRDATA 182. For write operations, CPU 110 drives the data on the KWDATA bus 184 and it is captured and written to the appropriate K-Bus memory. For those K-Bus cycles which are not mapped into the K-Bus memory, the K2M module 128 transmits the access on to the M-Bus 140 using MADDR bus 250 and MWDATA bus 254. For M-Bus read operations, the responding device drives the requested data back on the MRDATA bus 252. For M-Bus write operations, the K2M module 128 drives the write data on the MWDATA bus 254. If a reference is mapped into cache 246, but the data is not present (e.g., a cache "miss"), the K2M module 128 will initiate a block-sized fetch on behalf of the cache 246.

Table T-1 contains a more detailed K-Bus Interface Definition. Overlined signals are active low, otherwise, signals are active high. The "I/O" column identifies the direction of the signals from the point of view of the CPU 110. For example, the KADDR signals 180 are driven by the CPU 110 (output), while the KRDATA signals 182 are received (input) by the CPU 110.

TABLE T-1

K-Bus Interface Definition

| Signal Name | Bits | I/O | Function/Definition |
|---|---|---|---|
| KADDR 180 | 32 | Out | Address Bus |
| KTIP | 1 | Out | Transfer in Progress |
| KTT | 2 | Out | Transfer Type |
| | | | 00 = Normal Access |
| | | | 01 = Reserved |
| | | | 10 = Processor Debug Access |
| | | | 11 = CPU Space or Interrupt Ack. Accesses |
| KTM | 3 | Out | Transfer Modifier (when KTT = 00) |
| | | | 000 = Cache Push |
| | | | 001 = User Data Access |
| | | | 010 = User Code Access |
| | | | 011 = Reserved |
| | | | 100 = Reserved |
| | | | 101 = Supervisor Data Access |
| | | | 110 = Supervisor Code Access |
| | | | 111 = Reserved |
| KRW | 1 | Out | Read/Write (0 = Write/1 = Read) |
| KSIZ 358 | 2 | Out | Transfer Size |
| | | | 00 = Long Word (4 bytes) |
| | | | 01 = Byte |
| | | | 10 = Word (2 bytes) |
| | | | 11 = Line (16 bytes) |
| KWDATA 184 | 32 | Out | Unidirectional Write Data |
| KRDATA 182 | 32 | In | Unidirectional Read Data |

TABLE T-1-continued

K-Bus Interface Definition

| Signal Name | Bits | I/O | Function/Definition |
|---|---|---|---|
| KTA | 1 | In | Transfer Acknowledge |
| KTEA | 1 | In | Transfer Error Acknowledge |
| KIPL | 3 | In | Interrupt Priority |
| KRSTH | 1 | In | Hardware Reset |

Figure 6:
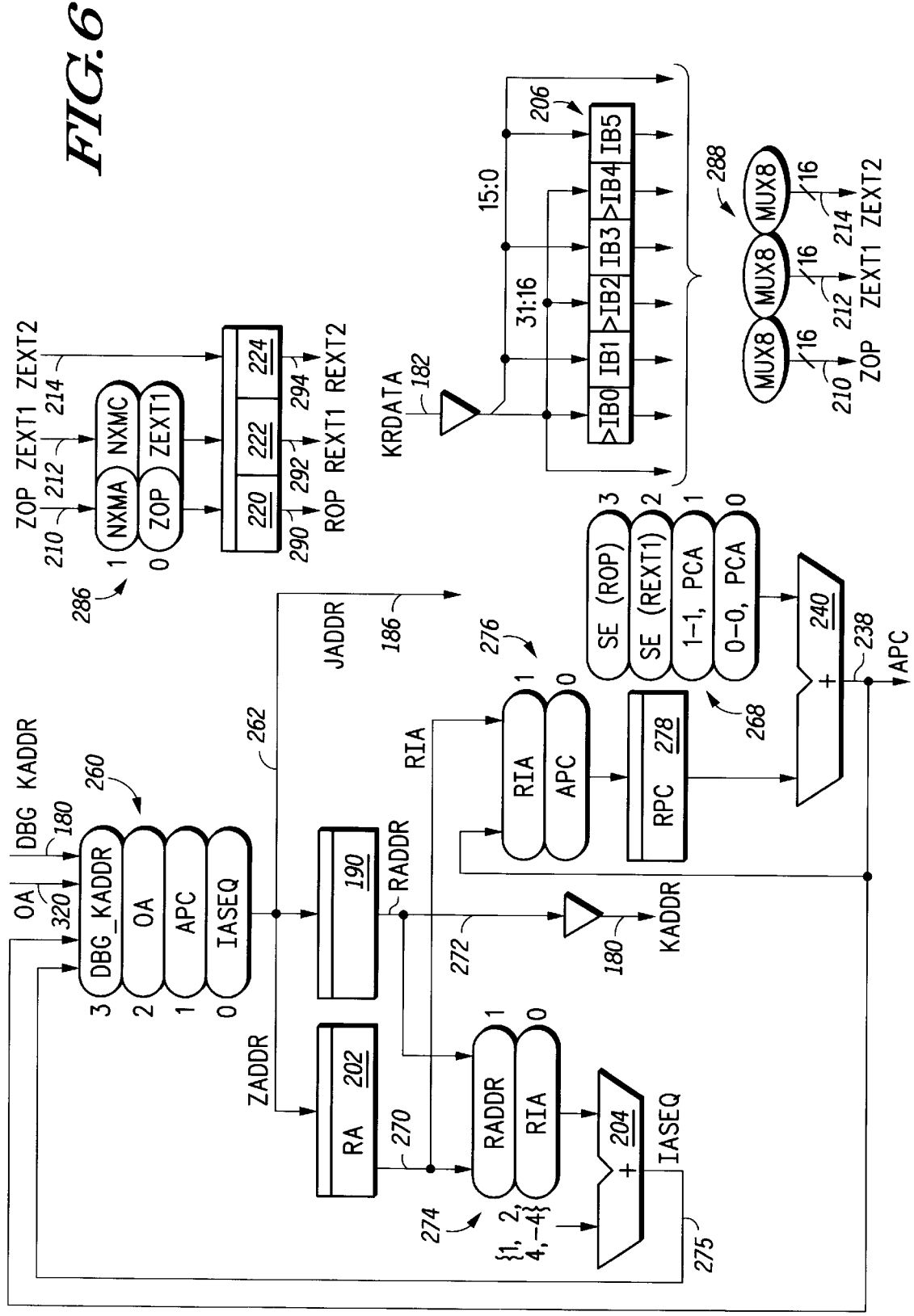
FIG. 6 is a block diagram showing portions of the Instruction Fetch Pipeline (IFP) section of CPU shown in FIG. 2.

FIG. 6 is a block diagram showing portions of the Instruction Fetch Pipeline (IFP) 160 section of CPU 110. The Instruction Fetch Pipeline (IFP) 160 contains three sections: Instruction Address Generation (IAG) 162, Instruction Fetch (IC) 164, and the Instruction Buffer (IB) 206.

The Operand Address (OA) 320 along with the K-Bus Address (KADDR) 180 from the Debug Module 112 (DBG_KADDR), the next sequential instruction address (IASEQ) signals 275, and the APC signals 238 are four input signals received by multiplexer (Mux) 260. Registered Address (RA) 202 register, and RZADDR register 190 are responsively coupled via ZADDR address lines 262 to mux 260. Also coupled to ZADDR address lines 262 are JADDR address lines 186. Mux 274 is responsively coupled to RA register 202 via RIA signal lines 270, and to RZADDR register 190 via RADDR address lines 272. Adder 204 is responsively coupled with mux 274. In address generation, the second set of input signals received by adder 204 comprise a selectable constant. For example, successive long words are addressed by adding a constant value of 4. Adder 204 is coupled via IASEQ signal lines 275 to Mux 260. RZADDR register 190 is coupled via RADDR address lines 272 to and provides addresses to the KADDR bus 180 in order to fetch the identified instruction or operand.

Mux 276 is responsively coupled to the RA register 202 and the APC signal lines 238. Register 278 is responsively coupled to Mux 276. Responsively coupled to adder 240 are register 278 and Mux 268. Mux 268 forms displacements to be added to the registered program counter value to calculate the next program counter value. Adder 240 is coupled via the APC signal lines 238 to and provides input signals to Mux 260 and Mux 276.

Of special interest here are the instruction addresses that are transmitted on the KADDR bus 180. A read request at the address on the KADDR bus 180 is indicated by asserting the KRW signal in conjunction with the KTIP signal (see Table T-1).

When the instruction at the address specified on the KADDR bus 180 is returned, it is received by the CPU 110 on the KRDATA bus 182. As shown in FIG. 3, the fetched instruction can be loaded into the FIFO Instruction Buffer 206, or bypassed directly into the three 16-bit instruction registers 220, 222, 224. Since the minimum instruction size is 16 bits, the 32-bit fetched instruction on KRDATA bus 182 is split into two 16-bit parcels, as shown in FIG. 6. The 16-bit parcels can then be loaded into one or more of the six locations within the FIFO instruction buffer 206 (IB0, IB1, IB2, IB3, IB4, IB5). The KRDATA bus 182 is also coupled to the three 16-bit multiplexers 288 via the ZOP signal 280, and ZEXT1 signal 282, and the ZEXT2 signal 284. The other inputs to multiplexer 288 are responsively coupled to the six locations of the FIFO instruction buffer 206. Mux 286 is responsively coupled to Mux(s) 288 via ZOP signal line 210 and ZEXT1 signal lines 212. The other inputs to Mux 286 (NXMA, NXMC) are formed by OEP 170 during the execution of the MOVEM instruction. OPcode register 220 and EXT1 register 222 are responsively coupled to Mux 286. EXT2 register 224 is responsively coupled to ZEXT2 signal lines 284. The output signals from OP register 220 are ROP signals 290, while the output signals from EXT1 register 222 are REXT1 signals 292, and the output signals from EXT2 register 294 are REXT2 signals 294.

Figure 7:
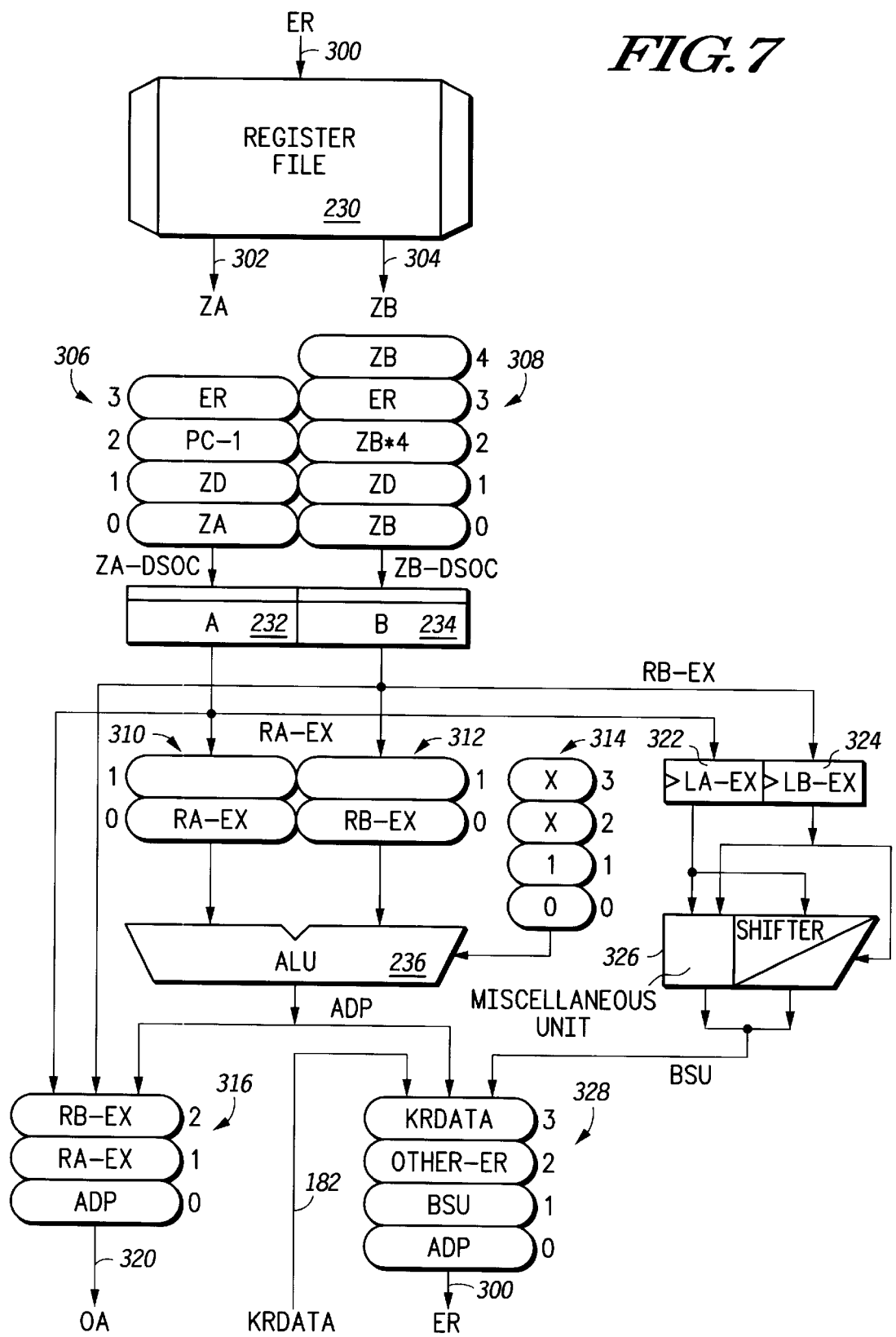
FIG. 7 is a block diagram showing portions of the Operand Execution Pipeline (OEP) shown in FIG. 2.

FIG. 7 is a block diagram showing portions of the Operand Execution Pipeline (OEP) 170. As shown in FIG. 4, the Operand Execution Pipeline (OEP) 170 has two phases, a Decode, Select, and Operand Fetch (DSOC) phase 172, and an Address Generation and EXecute phase (AGEX) 174.

Register File 230 contains the program-visible general purpose registers in CPU 110. Register File (RGF) 230 has ER signals 300 as an input. This plurality of input signals 300 is used to update register values in Register File 230. ZA signal lines 302 and ZB signal lines 304 provide two sets of output signals from Register File 230. In normal operation, the thirty-two bit long word value of one of the registers in Register File 230 is transmitted on ZA signal lines 302, while the value of one of the (usually) other registers in Register File 230 is transmitted on ZB signal lines 304.

ZA signals 302 and ZB signals 304 are coupled to and received by mux 306 and mux 308, respectively. Note that ER signals 300 are also coupled to and received by muxes 306, 308. This allows Register File 230 bypass. The output signals (ZA_DSOC) of mux 306 are coupled to and received by "A" register 232, while the output signals (ZB_DSOC) from mux 308 are coupled to and transmitted by a "B" register 234.

The output signals from the A register 232 and the B register 234 are coupled to and received by two corresponding muxes 310, 312. The two muxes, 310, 312 are coupled to and provide the two input operands to an Arithmetic/Logical Unit (ALU) 236. Mux 314 is coupled with and sources the carry input signal to ALU 236. Output signals from the A register 232 and B register 234 are also coupled with and received by latches 322, 324. Latches 322, 324 are coupled with and transmit signals to a Barrel Shifter and Miscellaneous Logical Unit 326.

The output signals from ALU 236, and Barrel Shifter and Miscellaneous Logical Unit 326, and input data signals from the K-Bus (KRDATA) 182 are coupled with and received by mux 328. Mux 328 transmits ER signals 300. Finally, A register 232, B register, and ALU 236 are coupled with and transmit signals to mux 316. Mux 316 in turn generates as output the Operand Address (OA) signals 320.

One of the Motorola 68000 instructions supported by the ColdFire system is the MOVEM instruction. This instruction is used to either load or store between one and sixteen registers at a time. The embodiment disclosed herein is an optimization of the MOVEM instruction wherein a transfer of four or more registers on a cache line (16 byte) boundary is optimized into a line length transfer.

The MOVEM instruction is either four bytes or six bytes long, depending on addressing mode. The OPcode field identifies the instruction as a MOVEM instruction. The EXT1 field is a bit field, indicating which of 16 registers are to be read or written. Each bit in the sixteen bit field corresponds to a different register. The EXT2 field is an optional displacement used in some addressing modes, but is not relevant hereafter in illustrating this embodiment.

Figure 8:
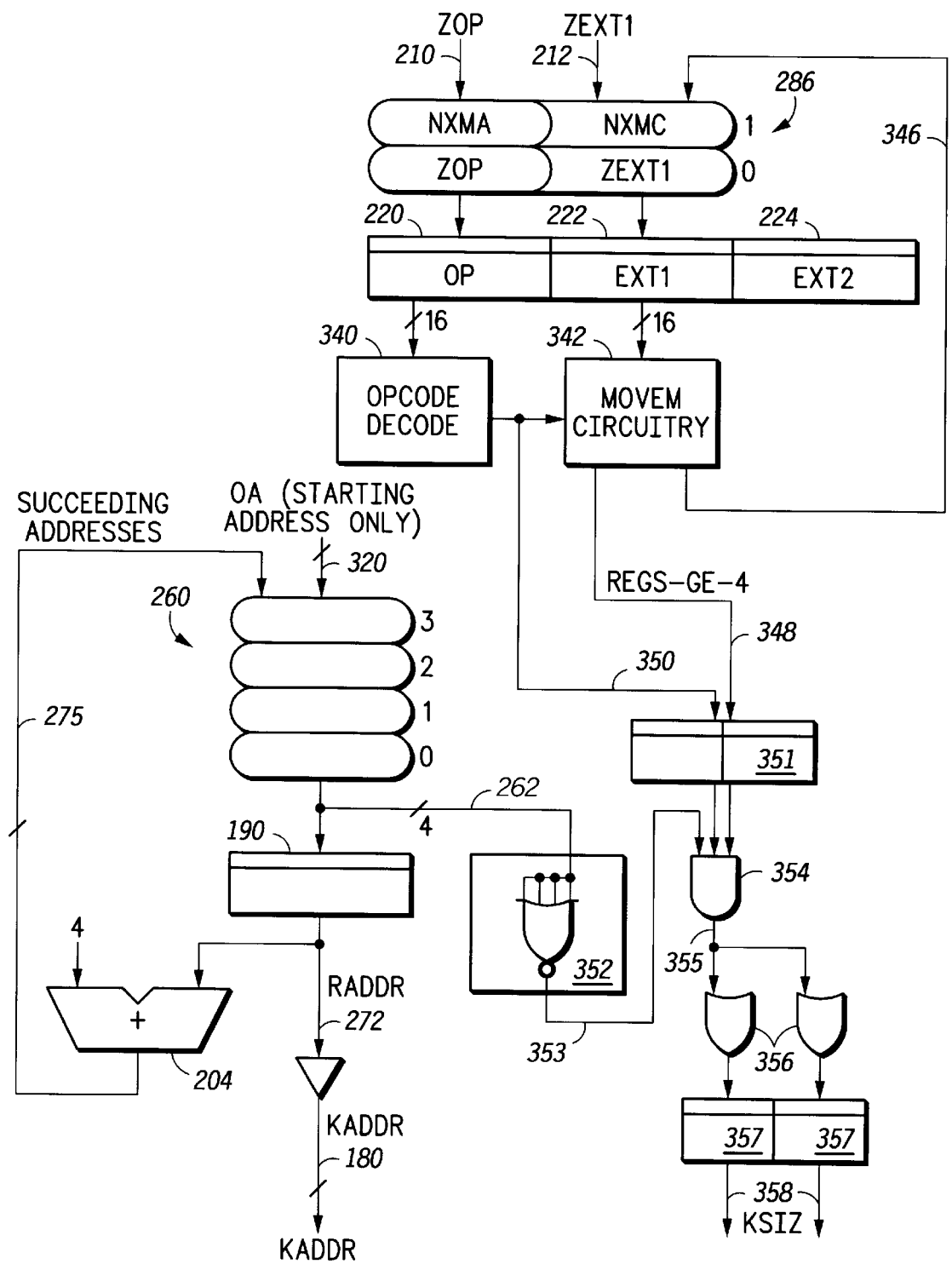
FIG. 8 is a block diagram that shows in more detail some implementation details in the CPU for optimization of MOVEM instructions, in accordance with the present invention.

FIG. 8 is a block diagram that shows in more detail some implementation details in the CPU 110 for optimization of MOVEM instructions. Instructions are received by mux 286. Mux 286 is coupled to and transmits signals to the OP register 220 and the EXT1 register 222. The OPcode register (OP) 220 is coupled to and transmits the operation code to the Instruction OPCODE DECODE module 340. The OPCODE DECODE module 340 determines what instruction is being executed and how to do the execution. The OPCODE DECODE module 340 is coupled to a MOVEM module 342. When a MOVEM instruction is identified by the OPCODE DECODE module 340, signal 350 is asserted, activating the MOVEM circuitry 342. In the MOVEM instruction, the EXT1 register 222 contains a bitmap defining the registers to be moved. For example, bit 0 can designate register 0, etc. As each register is processed, the next register to be moved is identified. At the same time, the MOVEM circuitry 342 calculates the encoded 4-bit register address of the next register to be processed and transmits this NXMA signal to Mux 286. As a register is processed, its corresponding bit in the NXMC signal is cleared and reloaded in the EXT1 registers 222. The execution of the MOVEM instruction continues until all designated registers have been moved, which is signaled by the contents of the EXTI register 222 being zero.

During each pass through the MOVEM circuitry 342, the number of bits asserted in the EXT1 register 222 is counted. This can be done quickly with a series of cascaded adders (not shown). If at least four bits are set, a Regs_GE_4 signal 348 is asserted by the MOVEM circuitry 342. A MOVEM Instruction signal 350 is asserted by the OPcode Decode Module 340 as the MOVEM instruction is processed.

Operand Address (OA) signals 320 are received by mux 260. This is the starting operand memory address of the MOVEM instruction. RZADDR register 190 is responsively coupled to Mux 260 via ZADDR address lines 262. K-Bus Address (KADDR) bus 180 is responsively coupled to RZADDR register 190 via RADDR signal lines 272. Also responsively coupled to RZADDR register 190 is adder 204 which increments the operand address by four (4) for each long word transferred. Mux 260 is also responsively coupled to adder 204, receiving the operand addresses 275 incremented by adder 204. Thus, the operand address for loading or storing the first register in a MOVEM instruction execution is received on OA signal lines 320, while all succeeding operand addresses are generated by adder 204 incrementing the previous operand address by four (4).

The ZADDR 262 signals comprise the operand address bits. The lower four of these bits are received by 0-Mod-16 circuitry 352 which performs Mod 16 computations, and if these lower four address bits are all zero, a 0_Mod_16 signal 353 is asserted. This test can be simply done by utilizing either a four way AND gate with negated inputs (Not Shown) or a four way NOR gate. Thus, whenever all four signals corresponding to the lower four address bits represent a zero value, the 0_Mod_16 signal 353 is asserted.

The registered Regs_GE_4 348, and MOVEM Instruction 350 signals 351, along with the 0_Mod_16 353 signal are all received by a circuit 354 used to test that all three signals are asserted at the same time. If all three signals are asserted at the same time, circuit 354 asserts an Optimize MOVEM signal 355. Testing all three signals can be done efficiently with a three input AND gate 354. The Optimize MOVEM signal 355 is received by OR gates 356 and loaded into two registers 357. Registers 357 are coupled with and are the source of the two-bit K-Bus reference size signal (KSIZ) 358 (see Table T-1). Thus, if the registered Regs_GE_4 signal 348, registered MOVEM Instruction signal 350, and 0_Mod_16 signal 353 are all asserted 354 at the same time, a KSIZ 358 value equal to binary '11' is transmitted onto the K-Bus 120 along with the MOVEM operand address on KADDR 180. This directs the rest of the K-Bus Complex 102 to perform 16 byte cache line length operations, instead of the normal long word (4 byte) operations usually performed in response to a MOVEM instruction.

Figure 9:
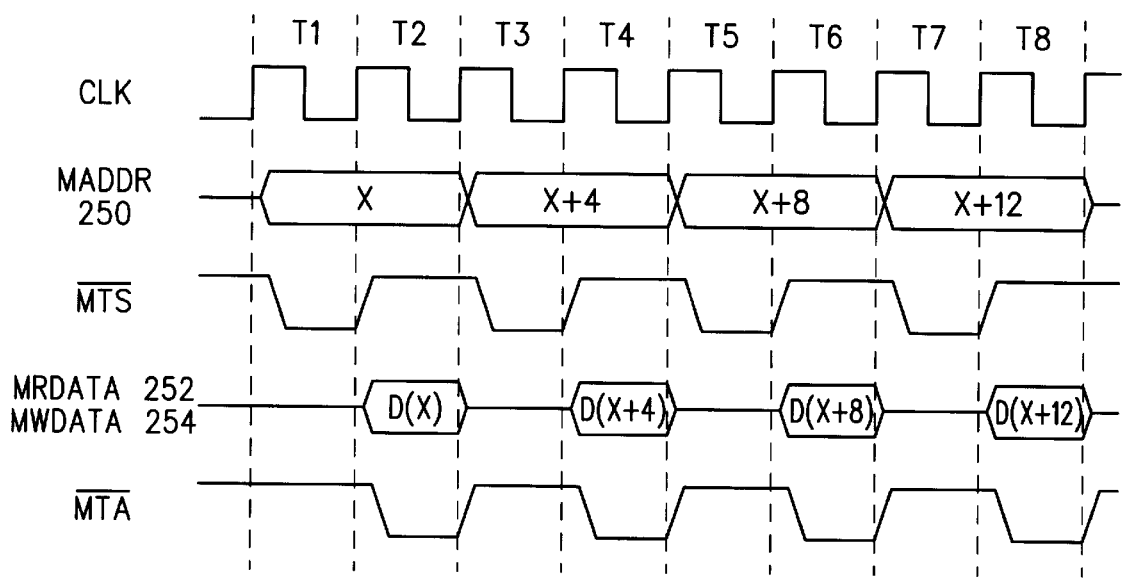
FIG. 9 (Prior Art) is a timing diagram showing the M-Bus signals for an unoptimized (Non-Burst) data transfer.

FIG. 9 (Prior Art) is a timing diagram showing the M-Bus 140 signals for an unoptimized (non-burst) data transfer. It takes a minimum of eight cycles to transfer sixteen (16) bytes or 128 bits. This is the minimum number of cycles that it would have taken a MOVEM instruction to load four registers from or store four registers to zero wait-state memory. Contrast this with FIG. 10 which is a timing diagram for the same M-Bus 140, but optimized to burst when four registers are read from or written to a single line. The result is that it takes a minimum of five cycles, instead of eight to transfer the sixteen (16) bytes. Note here that overlined signals are active low, while those without overlines are active high.

Figure 10:
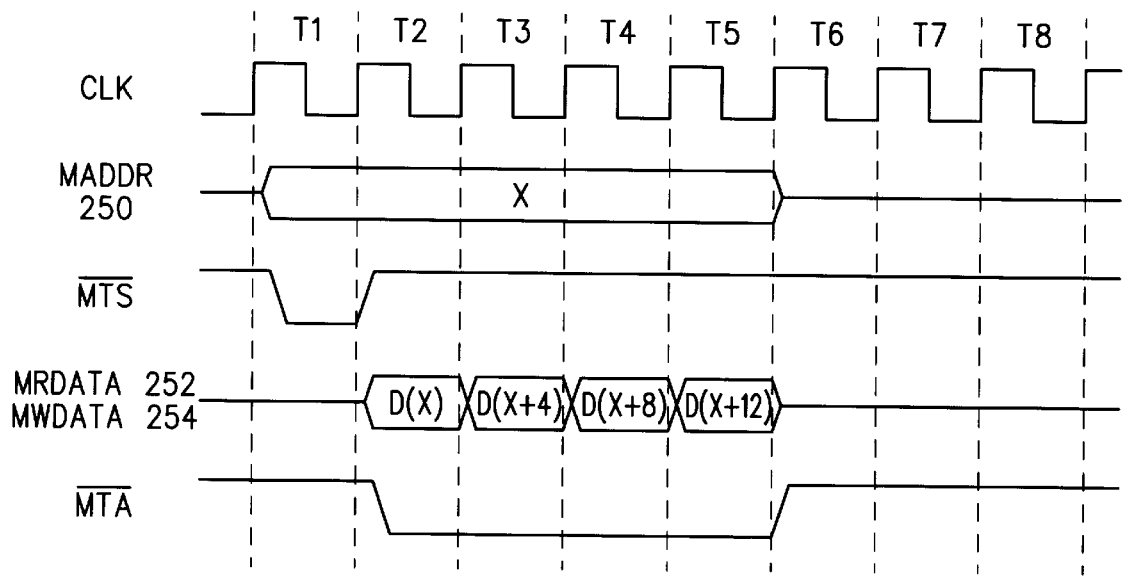
FIG. 10 is a timing diagram for the same M-Bus transfer as shown in FIG. 9, but in accordance with the present invention optimized to burst when four registers are read from or written to a single cache line.

In FIGS. 9 and 10, the CLK signal is the clock, MADDR bus 250 provides the memory address, MRDATA bus 252 provides the read data, and MWDATA bus 254 provides the write data. These latter two signals have been combined here for simplicity, but note should be made that only one of the two will normally be utilized at any one time. The MRW signal (not shown here) is used to distinguish between reads and writes. The MTS (M-Bus Transfer Start) signal is asserted (low) by the K2M Module 128 to indicate the start of a transfer, and the MTA (M-Bus Transfer Acknowledge) signal is asserted (low) by the System Bus Controller 152 in response to the device providing data, terminating the bus transfer. One difference between the prior art shown in FIG. 9 and this invention shown in FIG. 10 is that in FIG. 9, the MTS signal is asserted for each register or long word transmitted, while it is only asserted once to transfer four long word registers in FIG. 10. The additional three assertions of MTS in FIG. 9 account for the extra three cycles required.

Figure 11:
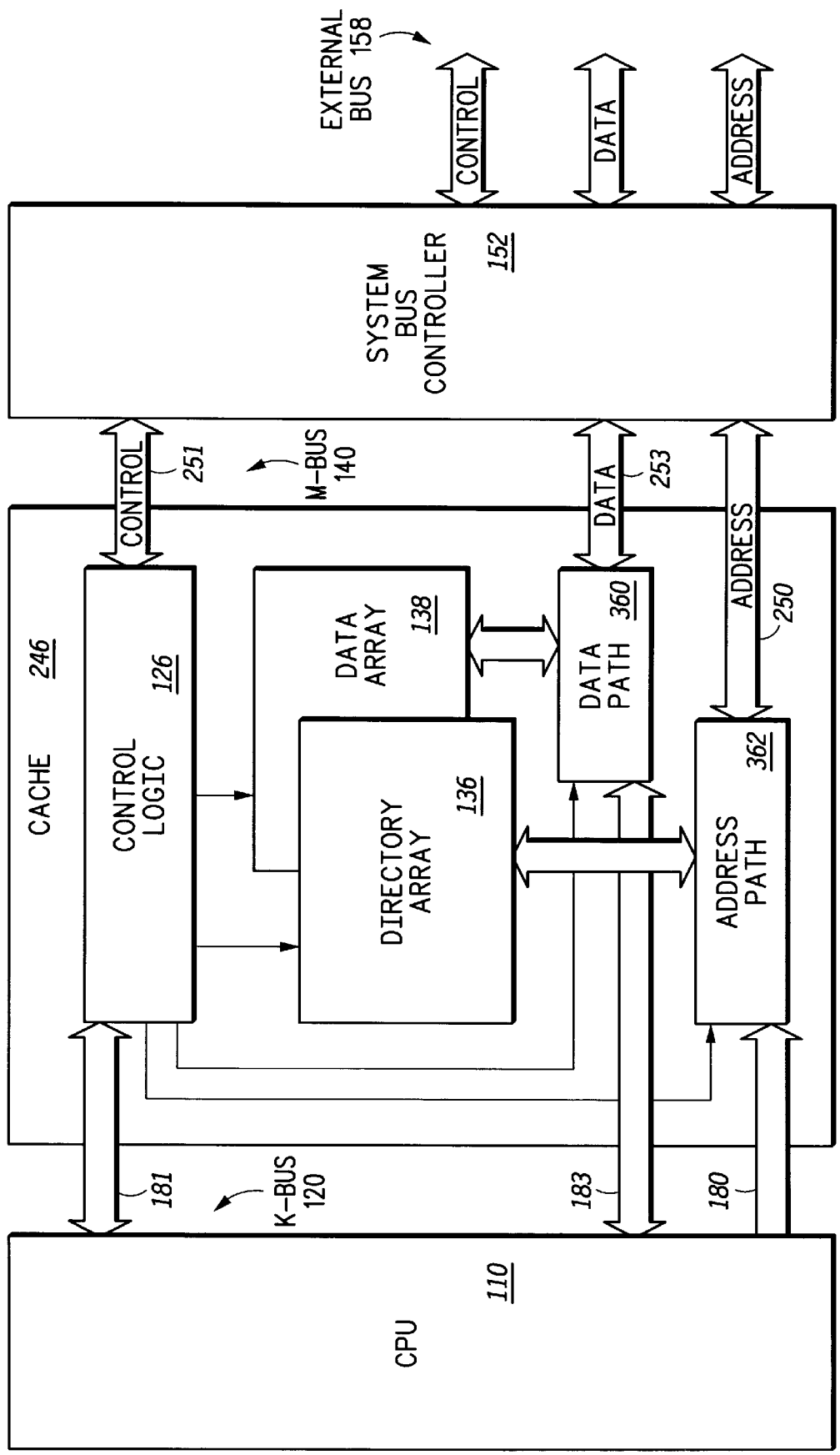
FIG. 11 is a hierarchical block diagram showing the Cache Subsystem, in accordance with the present invention.

FIG. 11 is a block diagram showing the Cache Subsystem 246. The Cache Subsystem 246 includes Cache Control 126, cache Directory Array 136, cache Data Array 138, and K2M 128 from FIG. 1. The K2M 128 is comprised of Data Path 360 and Address Path 362 as depicted in FIG. 11. The Cache Subsystem 246 has controller logic 126 that controls access to a Directory or Tag Array 136, a Data Array 138 for storage of lines of cache data, a Data Path 360, and an Address Path 362. The Directory Array 136 is coupled to and communicates with the Address Path 362. The Data Array 138 is coupled to and communicates with the Data Path 360. Addresses are transferred in and out of the Directory Array 136 using the Address Path 362, while the Data Path 360 is used for transferring data in and out of the Data Array 138.

The Cache Subsystem 246 is coupled to and communicates with the CPU 110 via the K-Bus 120. The K-Bus 120 has control signals 181, address signals (KADDR) 180, and data signals 183. The K-Bus 120 data signals 183 include the KRDATA bus 182 and KWDATA bus 184 signals. CPU 110 is coupled to the Control Logic 126 via the K-Bus control signals 181. CPU 110 is coupled to the Data Path 360 via the data portion of the K-Bus 183. CPU 110 is coupled to and transmits address signals to the Address Path 362 via the KADDR bus 180. The Directory Array 136, Data Array 138, Data Path 360, and Address Path 362 are coupled to and responsive to commands from the Control Logic 126.

The Cache Subsystem 246 is coupled to and communicates with the System Bus Controller 152 via the M-Bus 140. This is similar in operation to the K-Bus 120. The M-Bus 140 has control signals 251, data signals 253, and address signals (MADDR) 250. The M-Bus data signals 253 include the MRDATA bus signals 252 for reading data, and the MWDATA bus signals 254 for writing data. System Bus Controller 152 is coupled to and communicates with Control Logic 126 utilizing the M-Bus control signals 251. System Bus Controller 152 is coupled to and communicates with Data Path 360 utilizing the M-Bus data signals 253. System Bus Controller 152 is coupled to and communicates with Address Path 362 utilizing the M-Bus address signals (MADDR) 250. The System Bus Controller 152 is coupled to and communicates with the remainder of the system via the External Bus or E-Bus 158.

Figure 12:
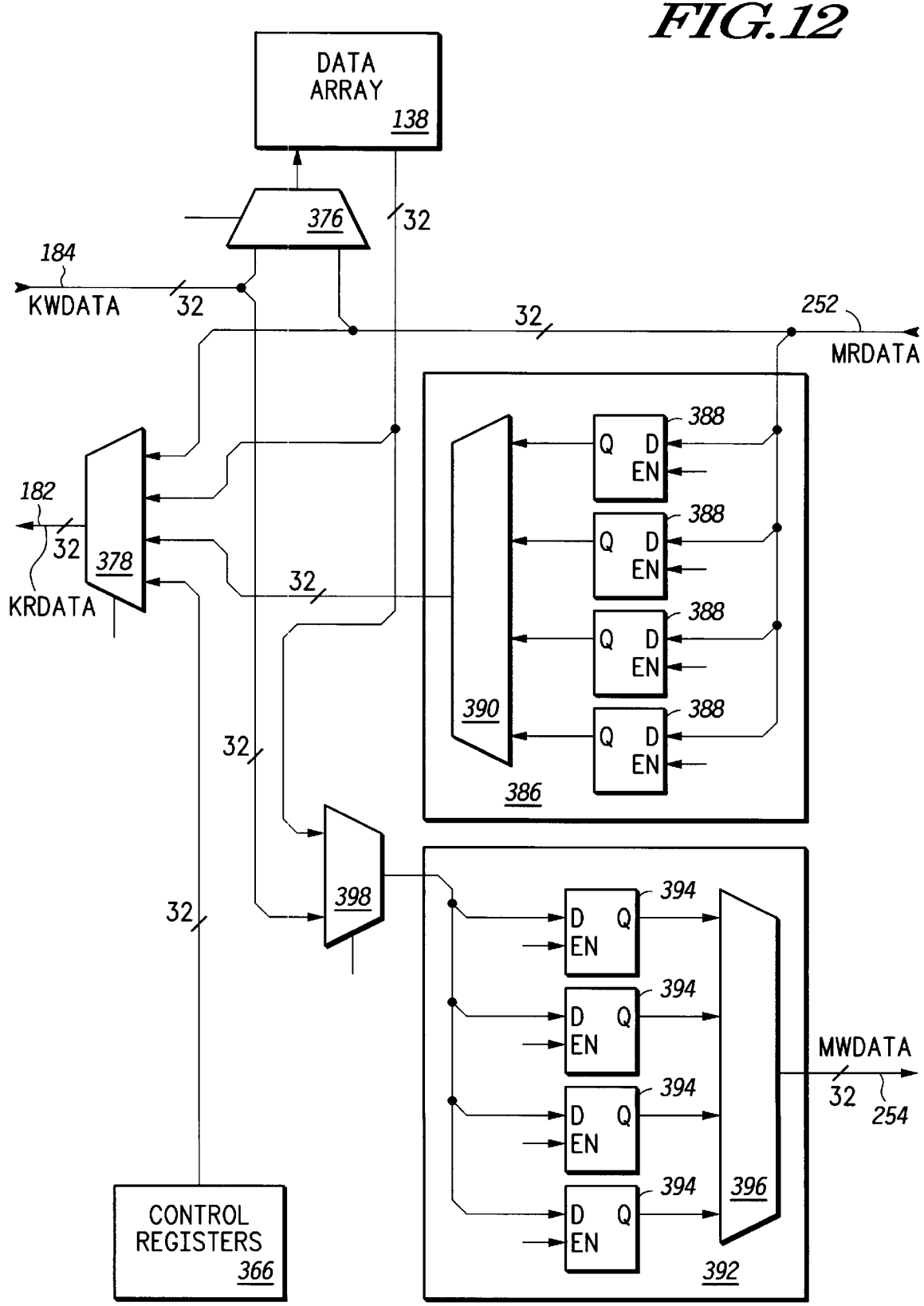
FIG. 12 is a schematic showing the Data Path portion of the Cache Subsystem shown in FIG. 11.

FIG. 12 is a schematic showing the Data Path 360 portion of the Cache Subsystem 246. Data arrives in the Cache Subsystem 246 via either the KWDATA bus 184, or the MRDATA bus 252 and is transmitted from the Cache Subsystem 246 via either the MWDATA bus 254 or the KRDATA 182 bus.

The KWDATA 184 and MRDATA 252 busses are coupled to and transmit signals to Mux 376. Mux 376 is coupled to and controls routing of data received from KWDATA 184 or MRDATA 252 busses to Data Array 138. The KWDATA bus 184 and the Data Array 138 are coupled to and transmit data bits to Mux 398. Mux 398 is coupled to and transmits data to an Output Store Buffer 392.

The MRDATA bus signals 252 are coupled to and transmit data bits to Input Fill Buffer 386. The Input Fill Buffer 386 comprises four long word registers 388 that are coupled to and receive input data bits from the MRDATA bus 252. As data long words from a cache line fill are successively received on the MRDATA bus 252, they are successively placed in the four registers 388. Selection of one of the four registers 388 for the servicing of a K-Bus read request is accomplished by the use of Mux 390 and Mux 378.

The KRDATA bus 182 is coupled to and responsive to signals from Mux 378. Mux 378 is coupled to and selectively responsive to MRDATA bus 252, Data Array 138, Input Fill Buffer 386, and Control Registers 366. MWDATA bus 254 is coupled to and responsive to data signals from Mux 396. Mux 396 is responsively coupled to four registers 394 in the Output Store Buffer 392. The four registers 394 are responsively coupled to Mux 398. Output Store Buffer 392 utilizes Mux 396 to transmit the contents of registers 394 over MWDATA bus 254.

Figure 13:
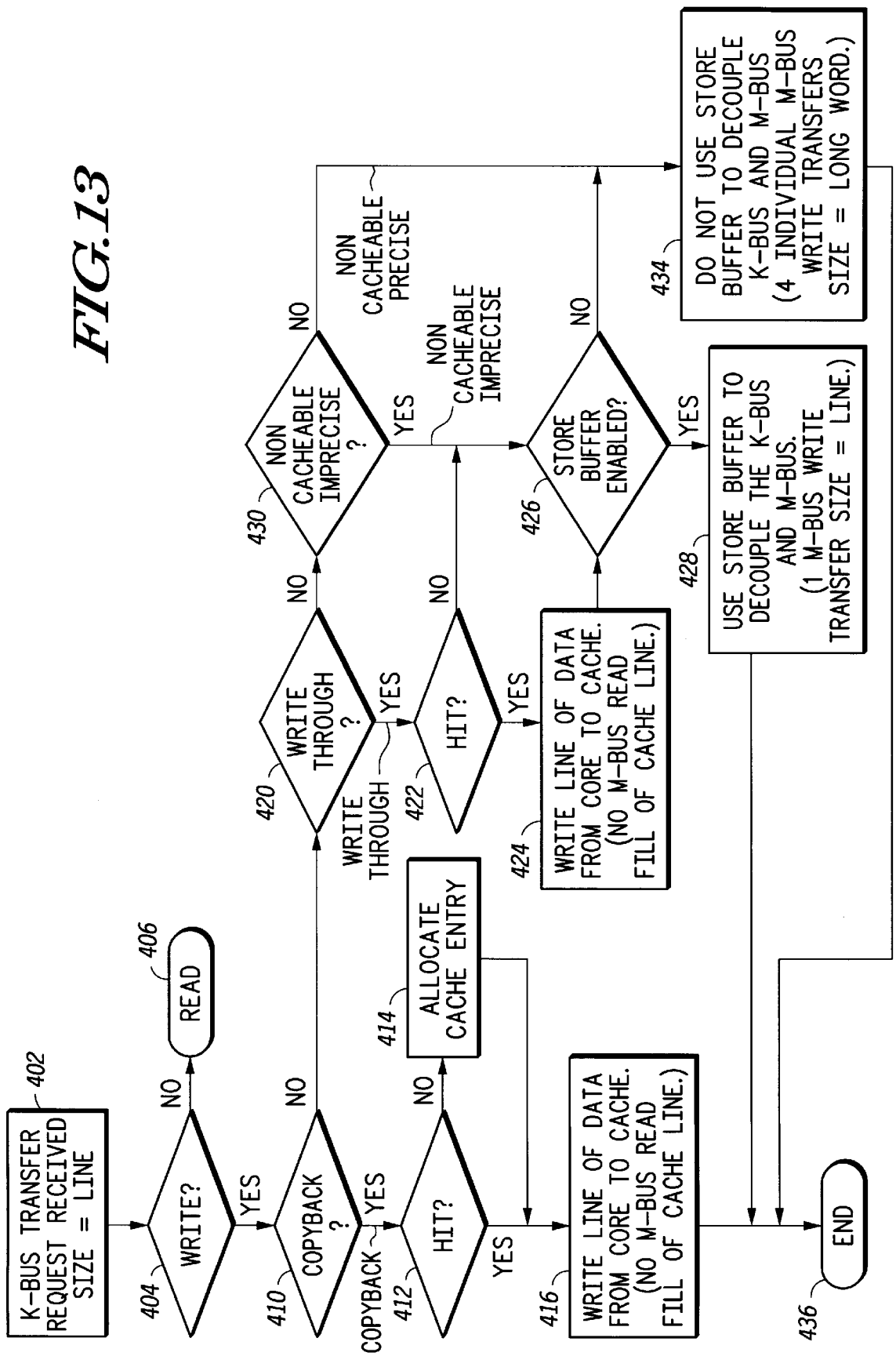
FIGS. 13 and 14 combined form a part of a flow chart that shows the interaction between the core and cache for this optimized operand movement.
Figure 14:
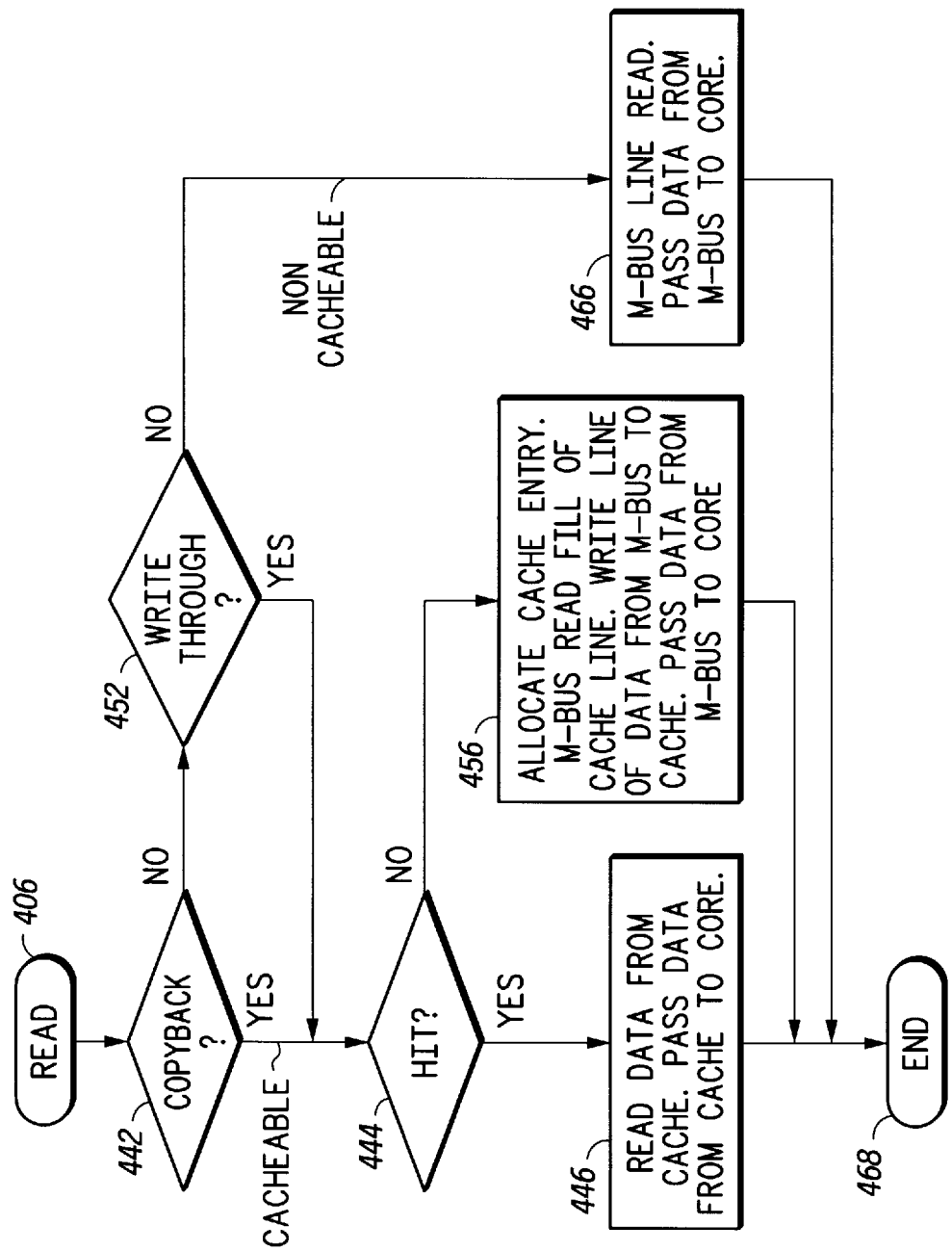

FIGS. 13 and 14 combined form a flow chart that shows the cache operation for optimized block sized data transfers.

The flowchart is entered, step 402, when a K-Bus 120 read or write request is received with a size indication of a line. Only accesses by the Core marked as a line size (KSIZ=11) are affected by this invention. The request is initiated by asserting the KTIP (K-Bus Transfer In Progress) signal. A check is made whether the request is a Read Request or a Write Request, step 404. This determination is based on the status of the KRW signal.

If a write request was indicated, step 404, by the KRW signal, a test is made as to the cache mode of the transfer, steps 410, 420, 430. If in copyback mode, step 410, the Cache Directory Array 136 is tested for a tag match (or "Hit"), step 412. If there is a cache "Hit", step 412, four registers from CPU 110 being written by the MOVEM instruction are sequentially received from the KWDATA bus 184 and routed by Mux 376 to the Data Array 138 where the four CPU registers are written to the cache line, step 416 corresponding to the "Hit" Directory Array 136 entry, and the request is complete, step 436. If no cache "Hit" was determined, step 412, a new cache line is allocated, step 414, before the new cache line is written into the cache line in the Data Array 138. This allocation, step 414, may require that the former contents of the allocated cache line in the Data Array 138 be pushed out of the Cache Subsystem 246 back via the MWDATA bus 254 into slower speed memory. Again, the four CPU registers are written to the cache line, step 416. Note that there is no "read before write" required here even though copyback write misses do cause a cache allocation. That is because it is known from the KSIZ=11 signals that a full four long word cache line is being received from the CPU 110.

If not in copyback mode, step 410, a test is made for write-through mode 420. If in write-through mode 420, a test is made for a cache "Hit" in the Cache Directory Array 136, step 422. If the address was a cache "Hit", step 422, the four CPU 110 registers being written by the MOVEM instruction are successively routed from the KWDATA 184 via Mux 376 to the Data Array, where the four CPU registers are written into the cache line corresponding to the cache "Hit", step 424. In any case (i.e. regardless of whether a "Hit" or "Miss" is determined in step 422), a test is then made whether the Store Buffer 392 is enabled, step 426. If enabled, step 426, the four CPU registers are routed via Mux 398 into the four Output Store Buffer 392 registers 394. The contents of the Output Store Buffer 392 are then transferred as an entire cache line out onto the MWDATA bus 254, step 428. This corresponds to the transfer depicted in FIG. 10. Otherwise, if in step 426 it is detected that the Store Buffer 392 is not enabled, the four CPU registers are transferred to the MWDATA bus 254 one long word register at a time, step 434. This corresponds to the transfer depicted in FIG. 9.

If not in write-through mode, step 420, a test is made for non-cacheable and imprecise mode, step 430. If non-cacheable and imprecise, step 430, the Store Buffer 392 is tested for being enabled, step 426. If enabled, step 426, the four registers from the CPU 110 are routed from the KWDATA bus 184 via Mux 398 into the Output Store Buffer 392 registers 394. The contents of the Output Store Buffer 392 are then transferred as an entire line to the MWDATA bus 254, step 428, as depicted in FIG. 10. Otherwise, if either the transfer is non-cacheable and precise, step 430, or the Store Buffer is not enabled, step 426, the four registers from the CPU 110 are transferred one long word at a time to the MWDATA bus 254, step 434, as depicted in FIG. 9. Finally, regardless of the path taken, the flow chart exits, step 436.

FIG. 14 is a flowchart that shows the action of the Cache Subsystem 246 for a read request when KSIZ=11, step 406. A test is made as to the cache mode of the transfer, steps 442, 452. If in copyback mode, step 442, or in write-through mode, step 452, the Cache Directory Array 136 is tested for a tag match (or "Hit"), step 444. If there is a cache "Hit", step 444, the data is read from the Cache Data Array 138 and passed through Mux 378 to the CPU 110 on the KRDATA bus 182. If in step 444 no cache "Hit" was made, a cache line is allocated and a cache line read fill is started. The cache line read fill corresponds to the transfer in FIG. 10. The fill data is received on MRDATA bus 252 and written through Mux 376 into Cache Data Array 138 simultaneous with being passed through Mux 378 to CPU 110, step 456 The process then ends, step 468.

If in step 452, write-through mode is not indicated, the transfer is non-cacheable. In step 466, an M-Bus line read is started. The line read corresponds to the transfer in FIG. 10. The fill data is received on MRDATA Bus 252 and passed through Mux 378 to CPU 110. The process then ends, step 468.

The invention then operates by detecting when a MOVEM instruction needs to load or store at least four registers when the operand address is on a cache line (16 byte) boundary. This is done by testing for execution of a MOVEM instruction, testing for at least four registers to load or store, testing for a current operand address modulo 16 equal to zero, and ANDing the results of the three tests to determine when to optimize the instruction execution. When the three tests are all true, the KSIZ signals 358 on the K-Bus 120 are forced by the added CPU 110 logic to equal "11". This indicates to the Cache Subsystem 246 a full cache line transfer request.

Indicating a full cache line transfer request to the Cache Subsystem 246 has a number of advantages when loading or storing four registers located on a cache line (16 byte) boundary. For writes, the first advantage is that a "reads before write" (cache line fill) can be eliminated when a new cache line is allocated in the Cache Subsystem 246 after an allocating cache "Miss" write. Secondly, writing from the Cache Subsystem 246 to external memory can be done a line (16 bytes) at a time, resulting in 5 cycles per 16 bytes, as shown in FIG. 10, instead of eight (8) cycles as shown in FIG. 9. For reads, again 16 byte full line transfers can be read from external memory, even if caching is disabled. This again results in transferring 16 bytes in 5 cycles, as shown in FIG. 10, instead of eight (8) cycles as shown in FIG. 9.

It can be appreciated that the MOVEM instruction optimization shown above is illustrative only. This invention is equally useful in optimizing any general purpose instruction that potentially transfers at least a cache line number of bytes to and/or from memory. For example, many processors implement a memory to memory transfer instruction. This invention is applicable to optimize both the read and write portions of such memory to memory transfer instruction.

Those skilled in the art will recognize that modifications and variations can be made without departing from the spirit of the invention.

Therefore, it is intended that this invention encompass all such variations and modifications as fall within the scope of the appended claims.

We claim:

1. A method of optimizing a data transfer utilizing a standard instruction, said method comprising the steps of:
   a) identifying an OP code that corresponds to the standard instruction requiring the data transfer;
   b) reading a field of the standard instruction to identify a set of registers containing data to be transferred and dynamically determining when at least a block sized number of bytes from the set of registers still need to be transferred during operation of the standard instruction;
   c) dynamically determining when an operand memory address is on a block boundary; and
   d) selectively designating that a data transfer be performed in an optimized manner when:
      step (a) has identified the OP code that corresponds to the standard instruction requiring the data transfer,
      step (b) has dynamically determined that at least the block sized number of bytes still need to be transferred, and
      step (c) has dynamically determined that the operand memory address is on the block boundary.

2. The method in claim 1 which further comprises:
   e) transferring data in the optimized manner when step (d) selectively designates that the data transfer be performed in the optimized manner.

3. The method in claim 2 wherein within step (e):
the optimized manner utilizes a burst mode.

4. The method in claim 2 wherein within step (e):
data is transferred from a CPU to a Memory.

5. The method in claim 4 wherein step (e) comprises:
   1) preventing a cache block read fill before an allocated cache miss write.

6. The method in claim 2 wherein within step (e):
data is transferred from a Memory to a CPU.

7. The method in claim 2 wherein within step (e):
data is transferred from a first Memory to a second Memory.

8. The method in claim 2 wherein within step (e):
data is transferred utilizing bursting in a noncache mode.

9. The method in claim 2 wherein within step (e):
a Store Buffer is used to buffer a block sized number of bytes of data.

10. The method in claim 2 wherein transferring data in the optimized manner in step (e) can be programatically disabled.

11. The method in claim 1 wherein:
the block sized number of bytes is equal to sixteen.

12. The method in claim 1 wherein:
the block sized number of bytes is equal to a number of bytes in a cache line.

13. The method in claim 1 wherein within step (a):
the standard instruction is a memory to memory transfer instruction.

14. The method in claim 1 which further comprises:
   e) providing a signal to a bus to indicate that a data transfer is to be performed in an optimized manner when step (d) has selectively designated that the data transfer be performed in the optimized manner.

15. The method in claim 14 wherein within step (e):
the signal provided to the bus is an operand size signal.

16. A method of optimizing a data transfer utilizing a standard instruction, said method comprising the steps of:
   a) identifying an OP code that corresponds to the standard instruction requiring the data transfer, wherein:
      the OP code identified does not explicitly define a quantity of data to transfer, and
      the standard instruction operates in all cache modes;
   b) reading a field of the standard instruction to identify a set of registers containing data to be transferred and dynamically determining when at least a block sized number of bytes from the set of registers still need to be transferred during operation of the standard instruction;
   c) dynamically determining when an operand memory address is on a block boundary;
   d) selectively designating that a data transfer be performed in an optimized manner when:
      step (a) has identified the OP code that corresponds to the standard instruction requiring the data transfer,
      step (b) has dynamically determined that at least the block sized number of bytes still need to be transferred, and
      step (c) has dynamically determined that the operand memory address is on the block boundary;
   e) providing a signal to a bus to indicate that a data transfer is to be performed in an optimized manner when step (d) has selectively designated that the data transfer be performed in the optimized manner; and
   f) transferring data in the optimized manner in response to the signal provided to the bus in step (e).

17. A microprocessor system that optimizes a data transfer when executing a standard instruction, said microprocessor system comprising:

a) circuitry for identifying an OP code that corresponds to the standard instruction;

b) circuitry for reading a field of the standard instruction to identify a set of registers containing data to be transferred and for dynamically determining when at least a block sized number of bytes still need to be transferred during operation of the standard instruction;

c) circuitry for dynamically determining when an operand memory address is on a block boundary; and d) circuitry for selectively designating that a data transfer be performed in an optimized manner when:

circuitry (a) has identified the OP code that corresponds to the standard instruction requiring the data transfer, circuitry (b) has dynamically determined that at least the block sized number of bytes still need to be transferred, and circuitry (c) has dynamically determined that the operand memory address is on the block boundary.

18. The microprocessor system in claim 17 which further comprises:

e) circuitry for transferring data in the optimized manner when circuitry (d) selectively designates that the data transfer be performed in the optimized manner.

19. The microprocessor system in claim 17 wherein:

the block sized number of bytes is equal to sixteen.

* * * * *